US006901540B1

(12) United States Patent
Griffith, Jr. et al.

(10) Patent No.: US 6,901,540 B1
(45) Date of Patent: May 31, 2005

(54) TLB PARITY ERROR RECOVERY

(75) Inventors: T. W. Griffith, Jr., Cedar Park, TX (US); Larry Edward Thatcher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,868

(22) Filed: Nov. 8, 1999

(51) Int. Cl.$^7$ .............................................. G06F 11/00
(52) U.S. Cl. ........................... 714/48; 714/53; 714/54; 711/206; 711/207
(58) Field of Search ............................ 714/48, 49, 53, 714/54; 711/205, 206, 144, 133

(56) References Cited

U.S. PATENT DOCUMENTS

| | | | | |
|---|---|---|---|---|
| 5,937,437 A | * | 8/1999 | Roth et al. .................. | 711/202 |
| 5,987,585 A | * | 11/1999 | Motoyama et al. ............ | 712/1 |
| 6,032,230 A | * | 2/2000 | Fuller et al. ................ | 711/141 |
| 6,134,699 A | * | 10/2000 | Steenburgh et al. .......... | 714/53 |
| 6,332,181 B1 | * | 12/2001 | Bossen et al. .............. | 711/117 |
| 6,336,168 B1 | * | 1/2002 | Frederick et al. ............ | 710/39 |
| 6,338,128 B1 | * | 1/2002 | Chang et al. ............... | 711/133 |
| 6,393,536 B1 | * | 5/2002 | Hughes et al. .............. | 711/118 |

* cited by examiner

Primary Examiner—Robert Beausoliel
Assistant Examiner—Yolanda L. Wilson

(74) Attorney, Agent, or Firm—Joseph P. Lally; Casimer K. Salvs; Anthony V.S. England

(57) ABSTRACT

A microprocessor, data processing system, and method are disclosed for handling parity errors in an address translation facility such as a TLB. The microprocessor includes a load/store unit configured to generate an effective address associated with a load/store instruction. An address translation unit adapted to translate the effective address to a real address using a translation lookaside buffer (TLB). The address translation unit includes a parity checker configured to verify the parity of the real address generated by the TLB and to signal the load store unit when the real address contains a parity error. The load store unit is configured to initiate a TLB parity error interrupt routine in response to the signal from the translation unit. In one embodiment, the TLB interrupt routine selectively invalidates the TLB entry that contained the parity error. The load/store unit preferably includes an effective to real address table (ERAT) containing a set of address translations. In this embodiment, the load/store unit invokes the address translation unit to translate the effective address only if the effective address misses in the ERAT. The LSU may suitably include an ERAT miss queue (EMQ) adapted to retain an effective address that misses in the ERAT until the address translation unit completes the translation process. In this embodiment, the EMQ is configured to issue a TLB parity error interrupt signal to initiate the TLB parity error interrupt routine. In one embodiment, the TLB interrupt routine loads a data address register (DAR) of the microprocessor with the effective address of the instruction that resulted in the parity error. The TLB interrupt routine may further set a data storage interrupt routine status register (DSISR) to indicate the TLB parity error.

22 Claims, 3 Drawing Sheets

TLB PARITY ERROR RECOVERY

BACKGROUND

1. Field of the Present Invention

The present invention relates to the field of data processing systems, and more particularly, to address translation mechanisms such as translation lookaside buffer (TLBs) and facilities for responding to an error detected during the address translation process.

2. History of Related Art

Data processing systems employing virtual addressing schemes are well known in the field of microprocessor based data processing systems. In a virtual address machine, each program can access the complete effective address (EA) of the system. To accommodate multiple programs running simultaneously, a virtual address (VA) is utilized. The virtual address space is larger than the effective address space so that operating system can allocate separate regions of the virtual address space to each program. Typically, the operating system associates some portions of the effective address space with private virtual address space regions for exclusive use by a program when the program is started. These private regions are not accessible to a second program. Other regions of the effective address space are associated with shared virtual address space regions that are accessible to some or all other programs. These shared regions may contain, for example, operating and subroutine libraries.

When an instruction that references an address in memory such as a load or store instruction is executed, the effective address of the instruction must be translated before the memory can be accessed. The address translation process may include translating the effective address to an intermediate address known as the virtual address and then converting the virtual address to a real address or physical address. The translation from an effective address to a virtual address is typically performed using a segment-lookaside-buffer (SLB) or a segment register, the content of which replaces some of the high order bits of the effective address. The resulting virtual address is subsequently translated to a real address using a translation-lookaside-buffer (TLB) or a page table. The TLB is a cache of the content of page table entries that have been used recently to translate virtual address.

The two step address translation described can reduce the performance of the processor. To address the performance penalties associated with a two step address translation, the processor may implement one or more effective-to-real address tables (ERATs) to translate effective addresses directly to real addresses. These ERATs are cache tables that contain the results of recent address translations. When an address generated by a program misses in the ERAT, the address translation must be performed using the SLB. If the program address also misses in the TLB, the TLB must be reloaded from system memory. The program latency associated with a memory access resulting from a TLB miss is significant enough to warrant the use of relatively large TLBs to reduce the TLB miss rate to an acceptable level.

For systems using 64 bits or more of addressing, the increasingly large number of entries desirable for an adequate TLB results in a TLB unit that occupies a significant area of the processor. As the size of the TLB grows, the likelihood that the TLB contains an error increases. It would therefore be desirable to implement a mechanism by which errors in the TLB would be quickly identified. It would be further desirable if the implemented solution were able to respond to a TLB with a precise exception routine.

SUMMARY OF THE INVENTION

The identified problems are in large part addressed by a microprocessor, data processing system, and method for handling parity errors in an address translation facility such as a TLB. The microprocessor includes a load/store unit configured to generate an effective address associated with a load/store instruction. An address translation unit adapted to translate the effective address to a real address using a translation lookaside buffer (TLB). The address translation unit includes a parity checker configured to verify the parity of entries in the TLB and to signal the load store unit when a TLB entry contains a parity error. The load store unit is configured to initiate a TLB parity error interrupt routine in response to the signal from the translation unit. In one embodiment, the TLB interrupt routine selectively invalidates the TLB entry that contained the parity error. The load/store unit preferably includes an effective to real address table (ERAT) containing a set of address translations. In this embodiment, the load/store unit invokes the address translation unit to translate the effective address only if the effective address misses in the ERAT. The LSU may suitably include an ERAT miss queue (EMQ) adapted to retain an effective address that misses in the ERAT until the address translation unit completes the translation process. In this embodiment, the EMQ is configured to issue a TLB parity error interrupt signal to initiate the TLB parity error interrupt routine. In one embodiment, the TLB interrupt routine loads a data address register (DAR) of the microprocessor with the effective address of the instruction that resulted in the parity error. The TLB interrupt routine may further set a data storage interrupt routine status register (DSISR) to indicate the TLB parity error.

BRIEF DESCRIPTION OF THE DRAWINGS

Other objects and advantages of the invention will become apparent upon reading the following detailed description and upon reference to the accompanying drawings in which.

Figure 1:
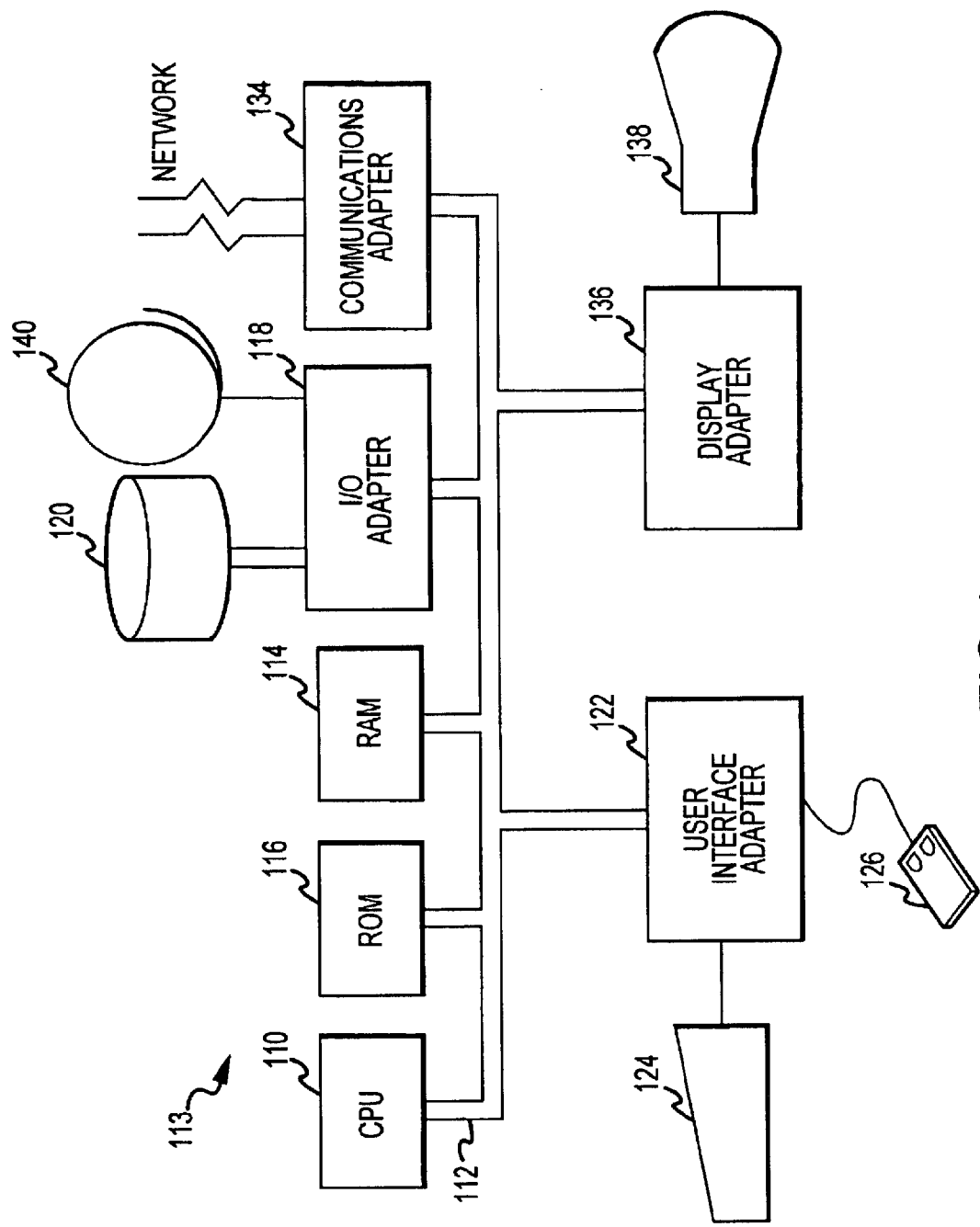
FIG. 1 is a simplified block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to FIG. 1, a simplified block diagram of a data processing system 113 in accordance with the invention is depicted. Data processing system 113 includes a processor (CPU) 110 connected to a system bus 112. Although the embodiment depicted in FIG. 1 indicates a single CPU 110, it will be appreciated that multiple CPUs may be connected to system bus 112 in a multiprocessor embodiment. As shown in FIG. 1, data processing system 113 further includes a system memory (RAM) 114. In addition, a user interface adapter 122 is connected to system bus 112 to provide facilities for input devices such as a keyboard 124 and a pointing device or mouse 126. Data processing system 113 further includes a display device such as a monitor indicated by reference numeral 138 connected to system bus 112 via a display adapter 136. An I/O adapter 118 is connected to system bus 112 and provides facilities for connecting mass storage devices such as a hard disk 120 or a tape drive unit 140. The communications adapter 134 connected to system bus 112 provides facilities for connecting data processing 113 to other data processing systems via a computer network. A non-volatile memory device (ROM) 116 may include computer instructions such as a basic input-output system (BIOS) or other fundamental soft routines that control the interaction of CPU 110 with other hardware.

Figure 2:
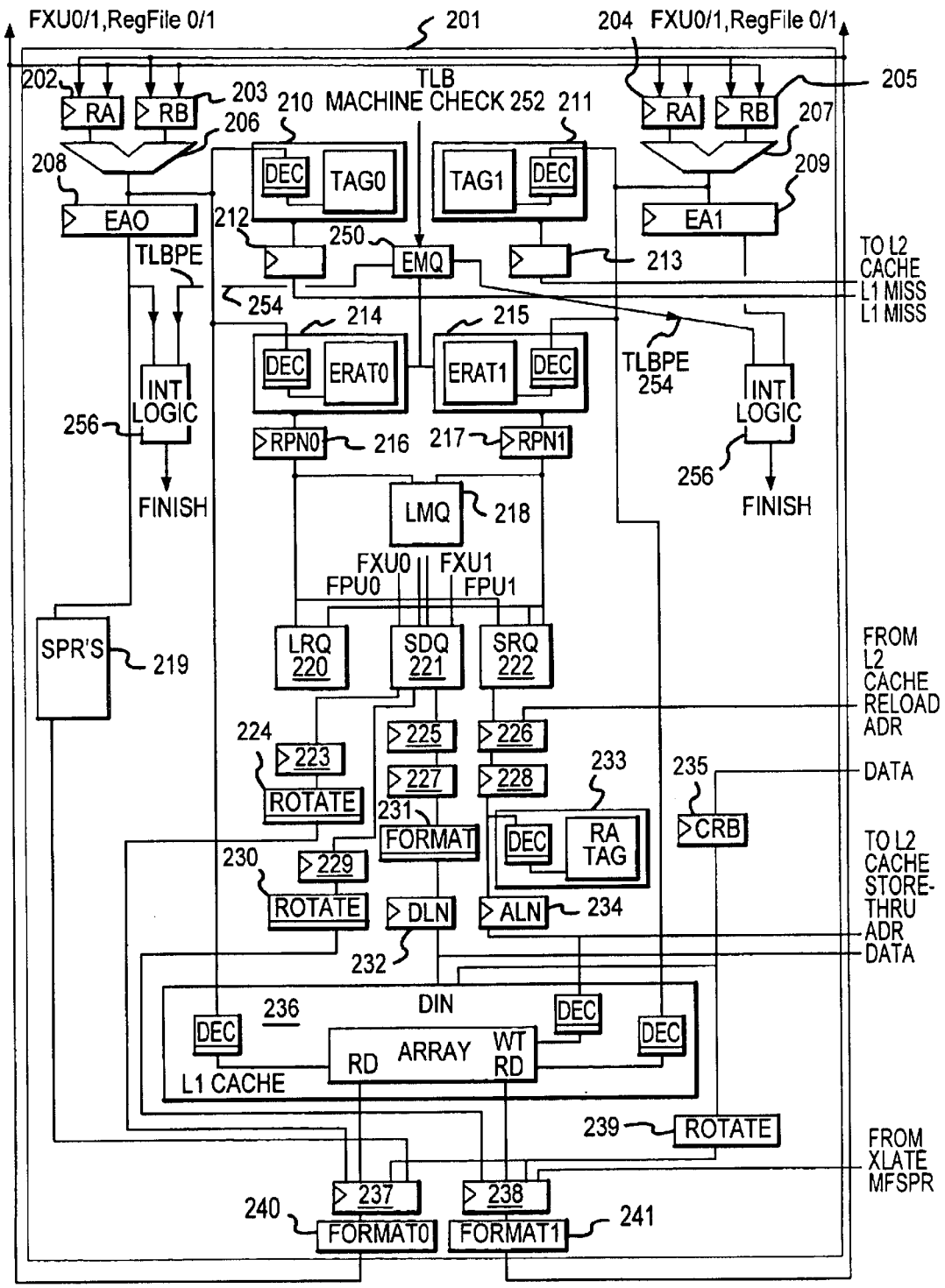
FIG. 2 is a simplified block diagram of a microprocessor according to one embodiment of the invention.

Turning now to FIG. 2, a load/store unit (LSU) 201 configured in accordance with the present invention is depicted. LSU 201 is a functional unit within CPU 110. In the depicted embodiment, LSU 201 includes a dual pipeline structure in which two load or store instructions can be issued per machine cycle. Registers 202 through 205 receive operands from fixed points units (not shown). A 64 bit adder 206 adds operands received from registers 202 and 203 to produce an effective address that is output to an effective address register 208. 64 bit adder 207 adds the operands from registers 204 and 205 to produce an effective address at register 209. The effective addresses are decoded to access tag arrays 210 and 211 to determine whether there is a hit or miss within L1 data cache 236. If there is a cache miss, then the addresses are passed through registers 212 and 213 and sent to an L2 cache (not shown) effective addresses are further sent from adders 206 and 207 to respective effective to real address translator (ERAT) arrays 214 and 215 respectively. The ERATs 214 and 215 output translated addresses through registers 216 and 217 if there is a hit to the ERAT table. Effective addresses from adders 206 and 207 also access L1 cache 236 for load operations after being decoded by decoders within L1 cache 236 if there is hit in the L1 cache 236, then the data is read out of the L1 cache 236 into registers 237, 238 and formatted by formatters 240 and 241 and returned on the result bus to be sent to a register file (not shown). The cache line read from L1 cache 236 is also returned into registers 202 through 205 for operations that are dependant on the result as an operand. If the effective address misses in the L1 cache, the request is forwarded to the L2 cache (not shown). The load miss queue (LMQ) 218 waits for the load data to come back from the L2 cache. The data associated with the cache line retreat from the L2 cache is then loaded L1 cache 236.

In the preferred embodiment, load operations can be performed speculatively and out of order. Store instructions may also be executed out of order. Store instructions are passed through the address translator operation in ERATs 214 and 215. They are then inserted into the store data queue (SDQ) 221 for storage into L1 cache 236 after the instructions have completed. Store instructions may execute out of order but are written but are written into L1 cache 236 in order.

Store reorder queue (SRQ) 222 keeps track of store instructions that have been executed. SRQ 222 maintains the store instructions in the queue and determines when the data is available in the store data queue (SDQ) 221 and when the store instruction will be the next instruction to complete. Registers 223, 225 through 229 and 237 through 238 are utilized for timing. Cache lines in L1 cache 236 are accessed based on the effective address of the cache line. The real address (RA) tag array 233 keeps track of where in the L1 cache 236 a cache line was written. Format block 231 takes the data from SDQ 221 and rotates it properly to write into the correct byte positions in L1 cache 236 upon execution of a store instruction. Rotate blocks 224 and 230 are utilized for store forwarding. If there is a store instruction that is waiting in the store queue and has not been written into the queue because it is not next to complete, and a younger load instruction is received that needs that data, the data will be forwarded to the load instruction being executed. Rotate block 239 is utilized to rotate data received from the L2 cache in response to an L1 cache miss, for forwarding the data from the L2 cache onto the result bus for forwarding to the proper register file. Register 235 is implemented for timing purposes to stage from the L2 cache (not shown). Format blocks 240 and 241 format or shift cache data into the proper byte positions for the load result to the register file.

Load/store unit 201 further includes an ERAT miss queue (EMQ) 250. EMQ 250 contains the effective addresses and other information for instructions that miss in ERATs 214 and 215 while the address translation process is in progress. EMQ 250 is configured to receive various control signals from an address translation unit portion of load/store unit 201 described in greater detail with respect to FIG. 3 below. In the present embodiment, EMQ 250 is configured to receive a TLB machine check signal 252 generated by the address translation. The TLB machine check signal 252 informs EMQ 250 that a parity error was discovered in the table look-aside-buffer during translation of an effective address that missed in ERATs 214 and 215.

Figure 3:
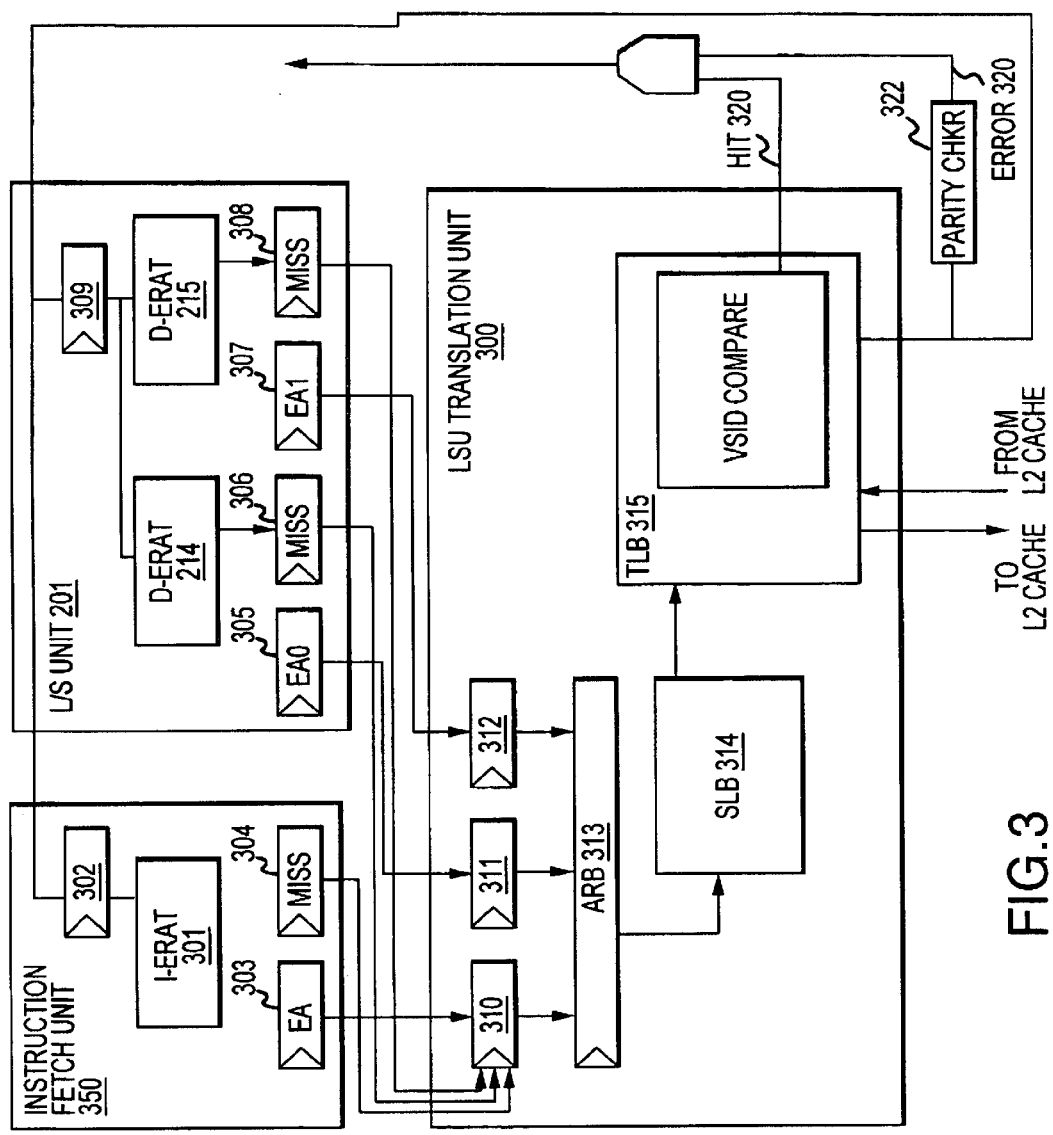
FIG. 3 is a simplified block diagram indicating selected portions of the microprocessor of FIG. 2.

Turning now to FIG. 3, a load/store translation unit 300 is depicted. LSU translation unit 300 is configured to receive effective addresses from load/store unit 201 and from an instruction fetch unit 350 that miss in their corresponding ERAT tables. In the depicted embodiment, load/store unit 201 includes two data ERAT tables 214 and 215 as discussed previously. In addition, an instruction fetch unit 350 includes an instruction ERAT table 301 that functions in a manner similar to data ERATs 214 and 215 for addresses that correspond to instructions rather than data. Each ERAT includes an effective address register and a miss signal register at its output. Instruction ERAT 301 includes an effective address register 303 and a miss register 304. The first data ERAT (D-ERAT0) 214 includes an EA0 register 305 and a miss register 306. A second data ERAT (D-ERAT1) 215 includes an effective address register (EA1) 307 and a miss register 308.

When an address misses in its corresponding ERAT, the ERAT generates a miss signal that is forwarded to its corresponding miss register. In addition, the effective address that missed in the ERAT is forwarded to the corresponding effective address register. The effective address registers 303, 305, and 307 are forwarded to respective registers 310, 311, and 312 in LSU translation unit 300. The miss signal information from miss registers 304, 306, and 308 are forwarded to an arbitration block 313 in LSU translation unit 300. Recall that the ERATs comprise a relatively small memory array for rapidly generating translation information. When an address generated by a program is not found in the relatively small ERAT, the address is forwarded to translation unit 300 to perform the address translation process.

In the depicted embodiment, CPU 110 includes only a single translation unit 300. Therefore, access to the translation unit facilities must be arbitrated in the event that multiple ERAT misses occur simultaneously. Arbitration block 313 may utilize any of a variety of arbitration schemes to select among registers 310, 311, and 312 for forwarding to the translation unit facilities in LSU translation unit 300. In the depicted embodiment, arbitration block 313 selects an effective address from registers 310, 311, or 312 and forwards the effective address to a segment lookaside buffer (SLB 314). SLB 314 is utilized to generate a virtual address from the effective address. SLB 314 generates, in response to receiving an effective address, a virtual address that includes a virtual segment identifier (VSID). The VSID is forwarded to translation lookaside buffer (TLB) 315 for comparison with a set of VSIDs stored therein.

TLB 315 includes a set of entries where each entry includes a VSID, which serves as a tag, and a real address component. TLB 315 compares a received address, such as the VSID, with its set of tags and determines if the VSID matched to one of the VSIDs in the TLB. If the VSID generated by SLB 314 matches or hits in TLB 315, the real address component of the matching TLB entry is output and a hit signal 320 is generated. The real address is then routed back to load/store unit 201 or instruction fetch unit 350 for the purposes of reloading the ERATs 214, 215, or 301. In addition, LSU translation unit 300 includes a parity checker 322 configured to check the parity of an entry in TLB 315 when a VSID comparison results in a cache hit. In the preferred embodiment, TLB 315 is configured to generate and store one or more parity bits corresponding to each entry when the TLB is loaded. When a TLB match occurs, parity checker 322 verifies the parity of the matched TLB entry. If parity checker 322 detects an error, it is asserts an error signal 324. If hit signal 320 and error signal 324 are simultaneously asserted, TLB machine check signal 252 is asserted and routed back to EMQ 250 (as shown in FIG. 2).

Returning now to FIG. 2, in response to receiving an asserted TLB machine check signal 252, EMQ 250 is adapted to assert a TLB parity error signal 254. TLB parity error signal 254 is preferably asserted by EMQ 250 while the effective address that was responsible for the TLB parity error is present in the pipeline. In the depicted embodiment, TLB parity error signal 254 is routed to an interrupt logic block 256. In response to receiving an asserted TLB parity error signal 254, interrupt logic block 256 initiates a TLB parity error recovery routine. In one embodiment, the TLB parity error recovery is configured to store the effective address that generated the parity error into a data address register (DAR) (not depicted) of microprocessor 110 and to write one or more bits in a data storage interrupt status register (DSISR) to indicate the TLB parity error as the source of the data storage interrupt. The DAR and DSISR are special purposes registers used for handling data storage interrupts. Additional information concerning data storage interrupts as implemented in prior are microprocessors is available in PowerPC™ Microprocessor Family: The Programming Environments (January, 1997) (IBM Order No.: G522-0290-00), which is incorporated by reference herein. In the preferred embodiment, the TLB parity error recovery routine is configured to read the DARs/DSISR to determine which address generated the TLB parity error signal. In response to determining the effective address that resulted in the TLB parity, one embodiment of the recovery routine is configured to selectively invalidate the specific entry within TLB 315 by accessing TLB 315 with the VSID corresponding to the effective address in the DAR while a TLB invalidate entry signal is asserted. After invalidating the appropriate TLB entry, the TLB parity error recovery routine completes and returns control to LSU 201, which allows the instruction corresponding to the parity error to finish execution with a machine check error signal. By routing the TLB machine check signal 252 to EMQ 250, the present invention facilitates the timely detection of a parity error in TLB 315 so that a precise interrupt routine, in which the effective address that resulted in the parity error, is recorded. In this manner, the error recovery routine is tailored to invalidate only the entry within TLB 315 that contained the parity error.

With the parity checking detection circuitry described herein, the address translation process may result in one of three conditions during a TLB comparison. In response to an ERAT miss, the effective address is translated to a virtual address by SLB 314. The VSID generated in SLB 314 is then routed to TLB 315 for comparison with the VSIDs stored therein. If the TLB comparison results in a TLB hit and parity checker 322 detects no parity error, the real address generated by TLB 315 is returned to the appropriate ERAT and the instruction is completed. If the TLB comparison of the VSID generated by SLB 314 results in a TLB miss, a page fault is returned to the ERAT in the appropriate TLB entry is retrieved from a page table entry in system memory. If the TLB comparison results in a TLB hit, but parity checker 322 indicates a parity error, the TLB machine check signal is returned to the ERAT. In one embodiment, the DAR is loaded with the effective address that resulted in the parity error and a TLB parity error recover routine initiated. Preferably, the recovery routine retrieves the information in DAR/DSISR to perform a precise interrupt routine in which only the entry in TLB 315 containing the parity error is invalidated. In one embodiment, the recovery routine may include the step of retrieving the appropriate page table entry from system memory in anticipation that the instruction that resulted in the parity error initially will be subsequently re-executed and will require translation in LSU translation unit 300. After the TLB parity error recovery routine is completed, the instruction that generated the error is allowed to execute. Upon completion, the machine check status of the instruction is evaluated and handled appropriately.

It will therefore be appreciated that the present invention contemplates a method of responding to a parity error in a table look-aside-buffer with a precise routine. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An address translation method in a microprocessor, comprising:

comparing an address associated with an instruction to a set of entries in a translation lookaside buffer (TLB), wherein each TLB entry includes a real address component;

responsive to detecting a TLB entry matching the address, checking the parity of the matching entry;

responsive to detecting a parity error in the matching entry, actively invalidating the matching entry in the TLB.

2. The method of claim 1, wherein actively invalidating the matching entry comprises accessing the matching entry in the TLB while asserting a TLB invalidate signal.

3. The method of claim 2, wherein the address compared to the set of TLB entries is an intermediate address generated in response to determining that an effective address associated with the instruction did not match to a set of entries in an effective to real address table.

4. The method of claim 2, wherein the instruction comprises a load/store instruction and the address comprises a data address.

5. The method of claim 2, wherein the address comprises an instruction address.

6. The method of claim 2, wherein invalidating the matching entry includes initiating a TLB parity error interrupt routine that records an effective address associated with the instruction.

7. The method of claim 6, wherein, upon completion of the interrupt routine, the instruction finishes execution.

8. The method of claim 2, further comprising reloading the matching entry in the TLB from system memory.

9. A microprocessor comprising:
   a functional unit configured to generate an effective address associated with a processor instruction; and
   an address translation unit adapted to translate the effective address to a real address using a translation lookaside buffer (TLB), wherein the address translation unit includes a parity checker configured to verify the parity of the real address generated by the TLB and to signal the load store unit when the real address contains a parity error;
   wherein the functional unit is configured to initiate a TLB parity error interrupt routine, in response to the signal from the translation unit, to actively invalidate an entry in the TLB that produced the real address.

10. The processor of claim 9, wherein the TLB interrupt routine selectively invalidates the TLB entry by accessing the entry in the TLB while asserting a TLB invalidate signal.

11. The processor of claim 10, wherein the functional unit includes an effective to real address table (ERAT) comprising a set of address translations, and further wherein the functional unit invokes the address translation unit to translate the effective address only if the effective address misses in the ERAT.

12. The processor of claim 10, wherein the TLB interrupt routine loads a data address register (DAR) of the microprocessor with the effective address of the instruction that resulted in the parity error.

13. The processor of claim 12, wherein the TLB interrupt routine further sets a data storage interrupt routine status register (DSISR) to indicate the TLB parity error.

14. The processor of claim 9, wherein the execution comprises a load/store unit (LSU) and wherein the ERAT comprises a data ERAT.

15. The processor of claim 14, wherein the LSU includes an ERAT miss queue (EMQ) adapted to retain an effective address that misses in the ERAT until the address translation unit completes the translation of the effective address.

16. The processor of claim 15, wherein the EMQ is configured to issue a TLB parity error interrupt signal to initiate the TLB parity error interrupt routine.

17. The processor of claim 10, wherein the functional unit comprises an instruction fetch unit and wherein the ERAT comprises an instruction ERAT.

18. A data processing system including a microprocessor, an input device, system memory, and a display device, the microprocessor comprising:
   a functional unit configured to generate an effective address associated with a processor instruction; and
   an address translation unit adapted to translate the effective address to a real address using a translation lookaside buffer (TLB), wherein the address translation unit includes a parity checker configured to verify the parity of the real address generated by the TLB and to signal the load store unit when the real address contains a parity error;
   wherein the functional unit is configured to initiate a TLB parity error interrupt routine, in response to the signal from the translation unit, to actively invalidate an entry in the TLB that produced the real address.

19. The data processing system of claim 18, wherein the TLB interrupt routine selectively invalidates the TLB entry by accessing the entry in the TLB while asserting a TLB invalidate signal.

20. The data processing system of claim 19, wherein the functional unit includes an effective to real address table (ERAT) comprising a set of address translations, and further wherein the functional unit invokes the address translation unit to translate the effective address only if the effective address misses in the ERAT.

21. The data processing system of claim 19, wherein the execution comprises a load/store unit (LSU) and wherein the ERAT comprises a data ERAT.

22. The data processing system of claim 19, wherein the functional unit comprises an instruction fetch unit and wherein the ERAT comprises an instruction ERAT.

\* \* \* \* \*